(12) United States Patent
Eick et al.

(10) Patent No.: US 9,726,770 B2
(45) Date of Patent: Aug. 8, 2017

(54) MULTIPLE ACTUATOR VIBRATOR

(71) Applicant: CONOCOPHILLIPS COMPANY, Houston, TX (US)

(72) Inventors: Peter M. Eick, Houston, TX (US); Joel D. Brewer, Houston, TX (US); Shan Shan, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 15/151,562

(22) Filed: May 11, 2016

(65) Prior Publication Data
US 2016/0334522 A1 Nov. 17, 2016

Related U.S. Application Data

(60) Provisional application No. 62/161,589, filed on May 14, 2015.

(51) Int. Cl.
*G01V 1/04* (2006.01)
*G01V 1/145* (2006.01)

(52) U.S. Cl.
CPC .................................. *G01V 1/145* (2013.01)

(58) Field of Classification Search
CPC .................................. G01V 1/09; G01V 1/04
USPC ........................................................ 181/114
See application file for complete search history.

(56) References Cited

U.S. PATENT DOCUMENTS

| 5,360,951 | A | 11/1994 | Turpening |
| 5,841,040 | A | 11/1998 | Walls |
| 6,338,394 | B1 * | 1/2002 | Meynier ............... G01V 1/143 181/113 |
| 7,628,248 | B2 | 12/2009 | Wei et al. |
| 7,813,224 | B2 * | 10/2010 | Krumhansl ........... G01V 1/147 181/121 |
| 7,841,444 | B2 * | 11/2010 | Cannell ................. G01V 1/02 181/101 |
| 8,261,875 | B2 | 9/2012 | Eick et al. |
| 8,276,462 | B2 | 10/2012 | Tao et al. |
| 8,371,416 | B2 | 2/2013 | Eick et al. |
| 8,453,512 | B2 | 6/2013 | Sasso et al. |
| 9,164,187 | B2 * | 10/2015 | Eick .................... G01V 1/09 |
| 9,170,342 | B2 * | 10/2015 | Eick .................... G01V 1/02 |
| 9,170,343 | B2 * | 10/2015 | Eick .................... G01V 1/145 |
| 9,217,796 | B2 * | 12/2015 | Eick .................... G01V 1/02 |
| 9,217,798 | B2 * | 12/2015 | Eick .................... G01V 1/145 |
| 9,217,799 | B2 * | 12/2015 | Eick .................... G01V 1/155 |
| 2010/0276224 | A1 | 11/2010 | Wei |

(Continued)

FOREIGN PATENT DOCUMENTS

EP 2365357 A1 9/2011

OTHER PUBLICATIONS

International Search Report—PCT/US2016/031717, International filing date May 11, 2016, Applicant ConocoPhillips Company; 3 pgs.

*Primary Examiner* — Forrest M Phillips
(74) *Attorney, Agent, or Firm* — ConocoPhillips Company (57) ABSTRACT

An improved baseplate design is described that correct the flexure with a plurality of actuators mounted on top of the base plate. Sensors and a feedback circuit enables the detection of flexure and a corresponding compensating scheme to correct and/or prevent the flexure in order for the baseplate to complete couple with the ground for more accurate seismic survey.

20 Claims, 7 Drawing Sheets

(56) References Cited

U.S. PATENT DOCUMENTS

2013/0250733 A1 9/2013 Phillips, III et al.
2013/0308422 A1 11/2013 Eick et al.

\* cited by examiner

MULTIPLE ACTUATOR VIBRATOR

PRIOR RELATED APPLICATIONS

Not applicable. This application is a non-provisional application which claims benefit under 35 USC §119(e) to U.S. Provisional Application Ser. No. 62/161,589 filed May 14, 2015, entitled "MULTIPLE ACTUATOR VIBRATOR," which is incorporated herein in its entirety.

FIELD OF THE DISCLOSURE

This disclosure relates to devices, systems and methods of generating synchronized vibration sources for use in seismic surveys, and more particularly to a vibrator having multiple actuators that can correct a baseplate if it is providing a distorted seismic source signal to the area being surveyed.

BACKGROUND OF THE DISCLOSURE

Various methods of geophysical exploration have been developed to aid in the determining the nature of subterranean formations for exploratory oil and gas drilling. The seismic survey is one form of geophysical survey that aims at measuring the earth's geophysical properties. It is based on the theory of elasticity and therefore tries to deduce elastic properties of materials by measuring their response to elastic disturbances called seismic (or elastic) waves.

There are three major types of seismic surveys: refraction, reflection, and surface-wave, depending on the specific type of waves being utilized. Each type of seismic survey utilizes a specific type of wave (for example, reflected waves for reflection survey) and its specific arrival pattern on a multichannel record.

In reflection-type seismic surveys, the reflected seismic waves are detected at or near the surface by a group of spaced apart receivers called geophones, accelerometers, seismometers or similar transducers. These transducers are collectively referred to as "geophones" herein following industry convention, but it is understood that they could be any sensor that detects seismic energy. The reflected seismic waves detected by the geophones are analyzed and processed to generate seismic data representative of the nature and composition of the subterranean formation at various depths, including the nature and extent of hydrocarbon deposits. In this way, the seismic information collected by geophones can be processed to form images of the subsurface.

It has become common in many cases for the source of propagating elastic waves to be a hydraulically-operated, truck mounted vibratory source, more simply referred to as a "vibrator" in the art. There are other forms of energy sources for vibrators like electromechanical or pure electric. All of these systems typically generate vibrations or shock waves by using a reaction mass member that is actuated by a hydraulic or electric system and electrically controlled by a servo valve driven by a pilot sweep.

In a typical embodiment, a vibrator comprises a double ended piston rigidly affixed to a coaxial piston rod. The piston is located in reciprocating relationship in a cylinder formed within a heavy reaction mass. Means are included for alternately introducing hydraulic fluid under high pressure to opposite ends of the cylinder or for an electric coil and magnet type assembly to impart a reciprocating motion to the piston relative to the reaction mass. The piston rod extending from the reaction mass is rigidly coupled to a baseplate, which is maintained in contact with ground surface. Since the inertia of the reaction mass tends to resist displacement of the reaction mass relative to the earth, the motion of the piston is coupled through the piston rod and baseplate to impart vibratory seismic energy in the earth.

Typically, vibrators are transported by carrier vehicle or truck, and it is also known to prevent decoupling of the baseplate from the ground by applying a portion of the carrier vehicle's weight to the baseplate during operation. The weight of the carrier vehicle is frequently applied to the baseplate through one or more spring and stilt members, each having a large compliance, with the result that a static bias force is imposed on the baseplate, while the dynamic forces of the baseplate are decoupled from the carrier vehicle itself. In this way, the force from the vibrating mass is transferred through the baseplate into the earth at a desired vibration frequency. The hydraulic system forces the reaction mass to reciprocate vertically, at the desired vibration frequency, through a short vertical stroke.

A significant problem with conventional systems employing a vibrating baseplate to impart seismic waves into the earth is that the actual motion of the baseplate, and thus the actual seismic energy imparted to the earth, deviates from the ideal motion represented by the pilot signal. This difference can be caused by a variety of factors, including (1) harmonic distortion or "ringing" of the baseplate, (2) decoupling of the baseplate from the earth's surface commonly referred to as bouncing or "pogo-sticking," (3) flexure of the baseplate, and (4) uneven ground resulting in inconsistent baseplate contact. Baseplate flexure is not only problematic from the standpoint of generating a distorted seismic signal, but it is also problematic because flexure of the baseplate contributes to structural failure of the baseplate through e.g., metal fatigue.

The differences between the pilot signal and the actual baseplate motion are problematic because, in the past, the pilot signal was used to pulse-compress the reflected seismic signal either through correlation (industry standard conventional "vibroseis") or inversion based techniques like ZenSeis® or HFVS. Thus, where the actual motion of the baseplate differs from the ideal motion corresponding to the pilot signal, the pulse-compressed reflected seismic signal that is produced by correlation or more modernly by inversion will be inaccurate.

These problems are known to the industry and several of the vibrator manufactures have tried to address them through stiffer baseplates, different airbags and hydraulic modifications with varying degrees of success. To date though, there has not been an all-encompassing solution to the problem as fixes to one part of the problem tend to exacerbate another. Hydraulic vibrators are really quite well optimized and a credit to the manufacturers, but they still have issues that need to be solved.

Some attempts have been made to address this flexure issue. In EP2365357, also by Applicants, an improved baseplate having reduced surface area and reinforced walls is proposed. However, some degree of flexure is still inevitable with this design. Therefore, there is a need in the art for an improved baseplate design to correct the flexure problem and also prolong the life of the baseplate.

SUMMARY OF THE DISCLOSURE

This disclosure describes methods and devices for generating synchronized vibration signals for seismic surveying. Generally, speaking, the disclosure relates to providing multiple actuators and sensors that can compensate for baseplate flexing, harmonics and ground decoupling by responding to and correcting these distortions, thus producing a source signal that is closer to ideal.

The disclosed apparatus and method describes the use of different actuators to be installed e.g., on top of the baseplate with a feedback circuit. At the same time, a matrix of ground force measurement cells is installed under or otherwise near the baseplate for real time ground force measurements. With this configuration, if a particular spot on the baseplate is flexing out of cycle with the rest of the baseplate due to setting up on a rock or buried tree stump or even just a node in the resonance of the baseplate, the actuators would be differentially activated to compensate for any distortion and would force the distorted portion of the baseplate to warp in sync with the surrounding parts of the baseplate.

In an alternative embodiment, an array of deformation sensors is configured inside the baseplate for detecting possible flexure thereof. The array of deformation sensors is connected to the feedback circuit, which in turn couples with a CPU that calculates the optimum compensating scheme to correct the flexure.

Another embodiment is a new baseplate of a vibrator that is created like a sandwich. Inside the baseplate is a grid of load cells with sensor surfaces contacting the ground directly or via the lower surface of the base plate, multiple actuators on top of the load cells, and a feedback circuit for monitoring the flexing of the baseplate. When the feedback circuit detects an out-of-cycle flexure, the actuators will compensate with appropriate force to keep the baseplate relatively in sync throughout the sweep, thereby obtaining high fidelity sweep.

This disclosure also describes a method of generating synchronized vibration signals for seismic survey, using any of herein described devices and/or principles.

The multiple actuators can be of any number as long as it is economically feasible and mechanically possible to compensate the flexure or other distortion. For example, one actuator near each of the four corners of a rectangular baseplate may be possible. Alternatively, an array of 8 can surround the central point or even an array of 64 units in an 8×8 array for more accuracy. Other configurations are also possible as long as the normal function of the vibratory source in seismic survey is not hampered by introducing excess electrical load on the prime mover in order to provide electrical power to compensate for the additional actuators.

The sensors used in this disclosure can be any known sensors that are durable under repeat pressure and can withstand the imparted loads. There are several flexure sensors currently used, including piezoelectric sensors, photo sensors and mechanical ones. A piezoelectric sensor that uses the piezoelectric effect to measure changes in pressure, acceleration or force and converting them to an electrical charge is a good example. An infrared phototransistor-based sensor that provides three axes of deflection sensing is also a good example of detecting any flexure of the baseplate. These sensors should withstand significant and repetitive forces and provide accurate results. Ease of repair and replacement of the sensors would be another prime selection point on choosing what type and method of installation would be used.

A central processing unit (CPU) or any other type of processor is used to control the movement of the actuators and thus the baseplate, and receives signals from the load cells or other sensors and/or the feedback circuit. The CPU also considers the point of flexure and the overall rigidity of the baseplate to adjust the actuators with suitable force to compensate for the flexure.

The disclosure includes any of the following embodiments in any combination(s) thereof:

A seismic vibrator truck, having a baseplate comprising:
  a plate body that is substantially planar and having a bottom surface and a top surface;
  an array of load cells or other sensors mounted near said bottom surface of the plate body so that the load cells can measure a plurality of forces that the baseplate applies to the ground;
  a plurality of actuators mounted above the top surface of the plate body and capable of reversibly contacting said top surface of said plate body;
  a central processing unit (CPU) or other processor operably coupled with said actuators and said load cells;
  wherein when a flexure in said plate body is detected with said load cells and said CPU or other processor controls the actuation of said plurality of actuators to compensate for said flexure.

A baseplate as herein described wherein said load cells or other sensors are mounted between said bottom surface and said top surface, or between said base plate and said ground surface, or mounted to a lower side of said top surface or mounted on an upper side of said top surface.

A baseplate as herein described wherein the flexure is detected by the uneven forces measured by the load cells.

A baseplate as herein described wherein at least one deformation sensor is operably coupled to the plate body and the CPU, and the deformation sensor detects the position and degree of the flexure.

A seismic baseplate to be used in a seismic truck, comprising:
  a plate body that is substantially planar and having a top surface and a bottom surface to contact a ground surface;
  an array of sensors mounted near the bottom surface of the plate body, wherein said sensors measure the force the plate body applies to the ground or a flexure in said plate body or both;
  a plurality of actuators mounted to reversibly contact a top surface of the plate body;
  a central processing unit (CPU) operably coupled with the actuators and the sensors;
  wherein when a flexure or differential force is detected by said sensors, said CPU controls the actuation of the actuators to compensate for said flexure or differential force.

A method of compensating for distortion of a seismic source used in a seismic survey, comprising the steps of:
  providing a baseplate of vibrator in contact with a surface of an area to be surveyed;
  providing a plurality of actuators for imparting a plurality of forces to said baseplate;
  providing an array of sensors near said baseplate;
  detecting with said array of sensors either a position and a degree of a flexure of said baseplate or a differential force or both;
  calculating a compensating matrix that comprises the magnitude and position of forces to be exerted on said baseplate to compensate for said flexure or differential force;
  executing said compensating matrix through said plurality of actuators to compensate for said flexure or differential force.

A method as herein described further comprising the steps of:
determining if the flexure is caused by metal fatigue or fracture of the plate body; and if yes, halting the seismic survey in order to maintain, repair or replace the baseplate or any of its components.

A method as herein described further including monitoring the array of sensor to determine whether the compensating matrix corrects the flexure or differential force.

A method as herein described further comprising storing the compensating matrix and corresponding physical parameters of the flexure or differential force. The stored values, especially once optimized as determined by said monitoring, can be used for all future actuations of the seismic source at that exact same location. Thus, the initial pulse or two or three can be subtracted from the survey, and only the optimized pulses or signals used in subsequent processing.

A method of compensating for a distortion of a seismic source baseplate as herein described by:
providing a baseplate;
detecting a position and a degree of a flexure in said baseplate;
calculating a compensating matrix that comprises the magnitude and position of forces to be exerted on the baseplate to compensate for said flexure;
executing the compensating matrix through a plurality of actuators to compensate for said flexure.

As used herein, a "baseplate" is a part of a seismic source generator that contracts the ground and is the mechanism by which force is transferred from the actuators to the ground.

As used herein, the "actuators" are the mechanism by which force is imparted to the baseplate, and thence to the ground. Typically, such actuators are rod and piston based, but this is not essential.

As used herein, a "load cell" is a sensor that measures load (force).

As used herein, a "sensor" is any device that measures force (load) or flexure (displacement). An array of sensors across the baseplate will allow the detection of differential forces or displacements across the baseplate, such leading to distortion in the seismic signal.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention, such as instructions for use, miscellaneous parts, such as fasteners, and the like.

BRIEF DESCRIPTION OF THE DRAWINGS

FIG. 2A-E illustrates the configuration of the disclosed baseplate.

DETAILED DESCRIPTION

Figure 1:
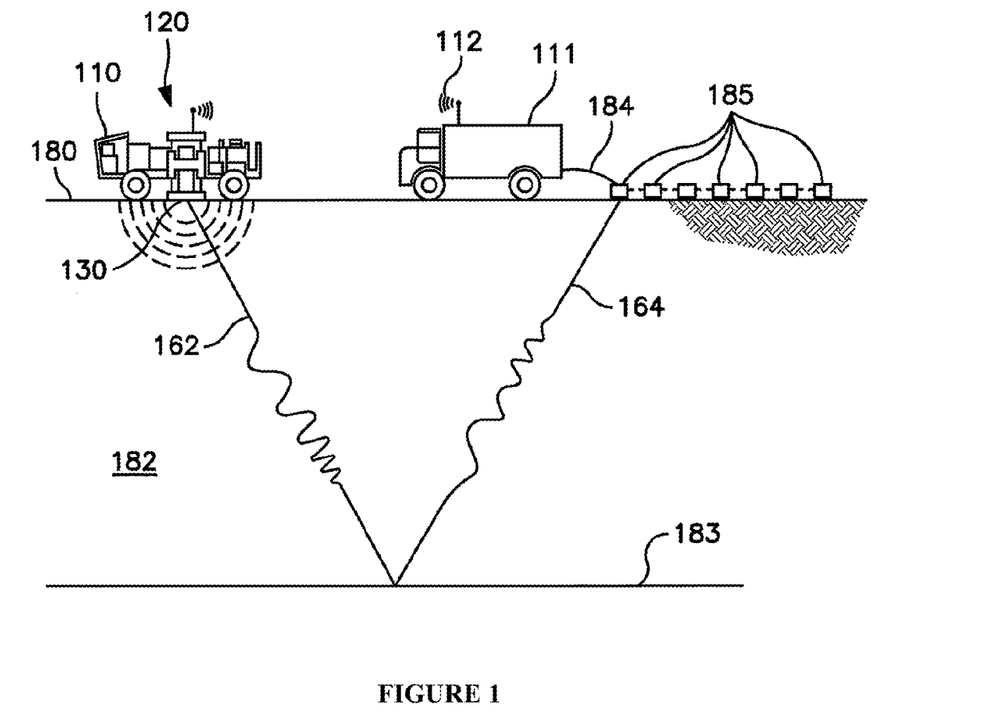
FIG. 1 illustrates in general how a seismic survey with a mobile vibratory source is conducted. The vibrator in this diagram can include the multi-actuator baseplate of the invention.

FIG. 1 provides a general schematic of a seismic survey. A pilot signal is generated in recorder/processor carrier vehicle 111 and sent by radio wave link 112 to a land vibrator 120. Land vibrator 120 converts the pilot signal into mechanical motion that vibrates baseplate 130. Baseplate 130 contacts ground surface 180 of the earth and is coupled to ground surface 180 by the weight of carrier vehicle 110. Baseplate 130 induces seismic waves 162 into subsurface 182 of the earth. Induced seismic wave 162 travels downward through subsurface 182 and is altered (i.e., refracted and/or reflected) by subsurface strata 183. Although the base plate is not detailed in this figure, it could be the multi-actuator base plate as described herein.

Altered seismic waves 164 travels from subsurface strata 183 upward through subsurface 182 to surface 180. Seismic receivers 185, such as geophones, located on surface 180, are generally spaced apart from each. Geophones can also be positioned in wells (not shown). Seismic receivers 185 detect altered seismic waves 164 at surface 180 and transmit an altered seismic signal indicating altered seismic wave 164? across geophone lines 184 to recorder/processor carrier vehicle 110. This communication may be accomplished via wires conventionally, or with autonomous recorders where the data is later collected and transcribed to the recording media. A baseplate signal is transmitted from land vibrator 120 via radio wave link 112 to recorder/processor carrier vehicle 110 for processing. In this way, seismic survey data is collected and subsequently interpreted so as to reveal the nature and the geology of subterranean formation 182.

Figure 2A:
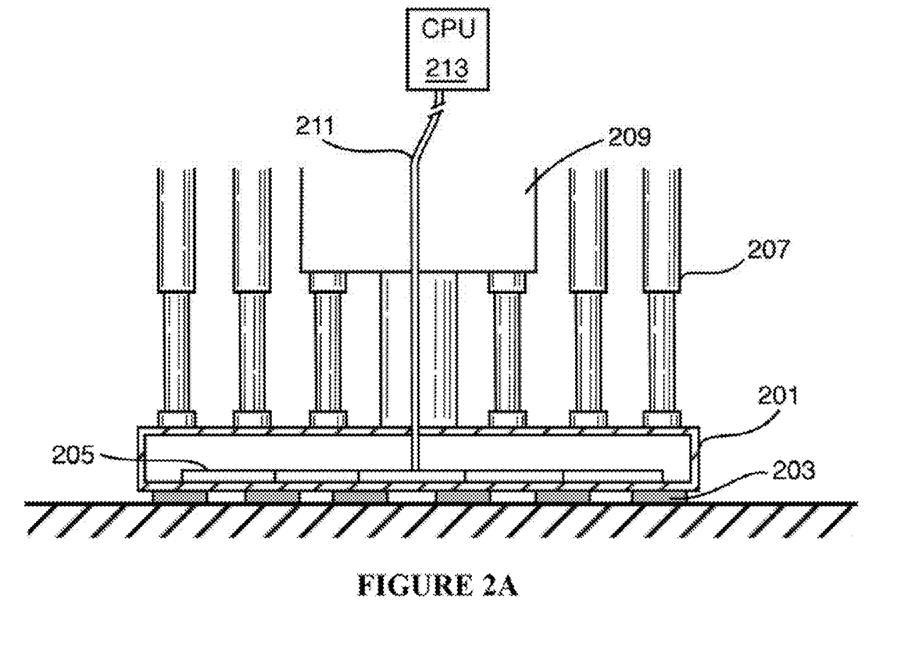
FIG. 2A shows the baseplate with load cells, actuators and feedback circuit.

The baseplate of this disclosure is described with reference to FIG. 2A-E. FIG. 2A shows one embodiment of the baseplate. The baseplate has a plate body 201 that is connected to a reaction mass 209, in which a piston driven to create necessary force through the baseplate, which has a bottom surface that contacts the ground to exert vibratory force as seismic source signals.

In order to correctly measure the force exerted, an array of load cells 203 is mounted at or near the bottom surface of the plate body 201. By "near" we mean to imply sufficient proximity to the bottom surface of the baseplate as to accurately determine whether the baseplate is flexing or otherwise imparting a distorted signal to the ground. We have shown in FIG. 2A the load cell/sensor on the bottom of the plate (e.g., on the ground facing surface), but they could also be inside the plate, on top of it, or even separate therefrom and positioned under the base plate, e.g., as a ground cover that is wired or wireless connected to the processor. Indeed, such may be preferred as allowing for easier replacement of the sensors, the wiring, or just general maintenance of the sensor array.

The sensors 203 are e.g., piezoelectric sensors that measure the ground forces of the baseplate through deformation that converts to electrical signals. However, other sensors may be used, such as the fiber optical strain sensor disclosed in U.S. Pat. No. 8,276,462, which is incorporated in its entirety by reference for all purposes.

The load cells or other sensors 203 are operably connected to the feedback circuit 205 that is operably coupled to a CPU 213 through wiring 211 or in other embodiments wirelessly. In this embodiment, the load cells also serve as flexure detectors based on the assumption that the baseplate should be evenly coupled to the ground, thus the ground force measured at each load cell should not vary significantly from others. If a certain load cell measures a low ground force as compared to other load cells, it may be determined that a flexure occurs at or near the load cell, and the degree of flexure may also be determined. Similarly, if a load cell measures a high ground force as compared to other load cells, it may be determined that at or near that load cell a flexure has occurred.

On the top surface of the plate body 201 an array of actuators 207 is provided. The actuators 207 are preferably hydraulically driven, but can also be electronically or electromagnetically driven, whichever is best suited for intended use and depending on the available power resources of the prime mover on the vibrator chassis. The placement of the actuators takes into consideration the stiffness of the plate body and the maximum force of each actuator such that the flexure at any point of the baseplate can be adequately compensated for sufficient and even coupling with the ground.

In one embodiment, there are four actuators arranged as 2×2 on top of the baseplate. In another embodiment, there are nine actuators arranged as 3×3 on top of the baseplate, excluding the center occupied by the reaction mass/piston discussed above. In yet another embodiment, there are sixteen actuators arranged as 4×4 on top of the baseplate. Other arrangements are possible.

The baseplate and the load cells or sensors and actuators may be configured differently depending on the type of vibrators used. In one alternative approach illustrated in FIG. 2E, smaller linear actuator type motors 207' could be inserted into the actual baseplate 201' itself forming a sandwich that was described previously so that would allow for electrical drive of the actuators. The actuator type motors 207' are integrated with the baseplate 201' so that the actuation thereof to compensate the deformation will occur within the baseplate 201', rather than from a top surface. Load cells 203' are shown on the exterior bottom surface of the plate, but could also be on an interior side of the bottom surface, or separate and be between the ground and the plate.

To a certain extent the location and placement and method of the attachment of the actuators and load cells or other sensors is dependent on the actual vibrator used and will require some engineering to install and operate. For the purposes of explaining the invention we will continue to use the concept described above but recognize there are many variations about how to achieve the inventive concept without deviating from this disclosure.

Once a point of flexure is determined as well as the degree of flexure, the CPU then calculates the point of flexure in relation to the nearby actuator(s) to generate a matrix of magnitude of force and position of actuator(s). The matrix is then executed by each corresponding actuator.

Figure 2B:
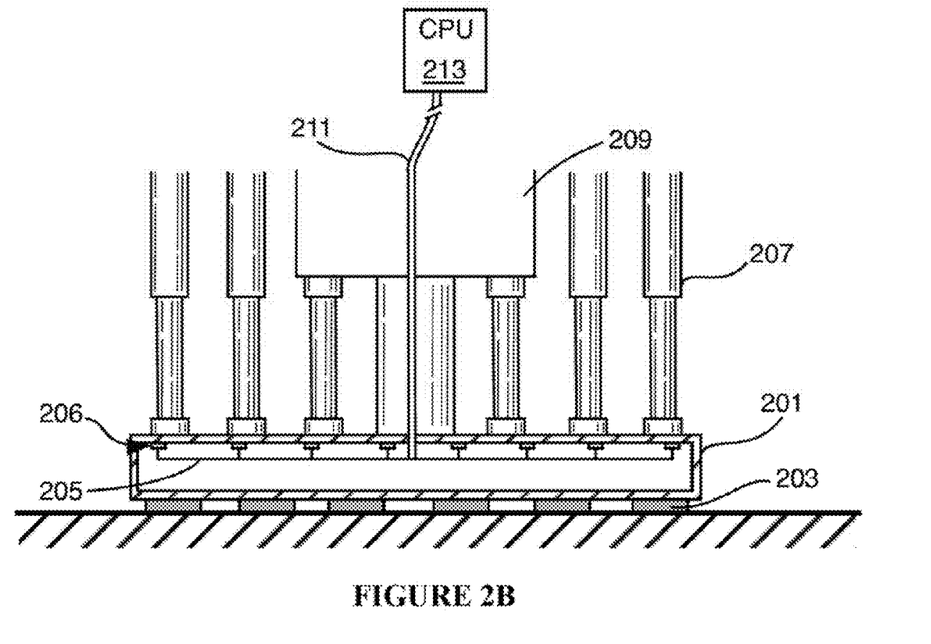
FIG. 2B shows a similar embodiment to FIG. 2A, except an array of sensors are included.
Figure 2C:
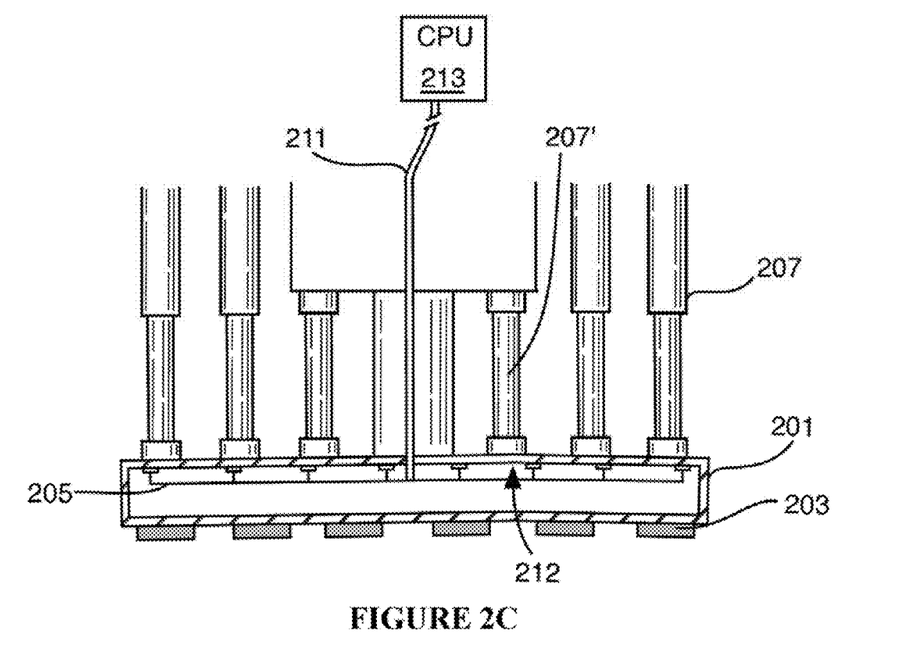
FIG. 2C shows an upward flexure.

For example, in FIG. 2C, a point of upward flexure 212 is detected, which is directly underneath actuator 207'. The CPU 213 then calculates the force to be exerted by the actuator 207' based on the degree of flexure and the stiffness of the baseplate. By pushing down the actuator 207' at the point of flexure with adequate force, the baseplate can now more evenly couple to the ground and impart seismic energy closer to the ideal value.

Figure 2D:
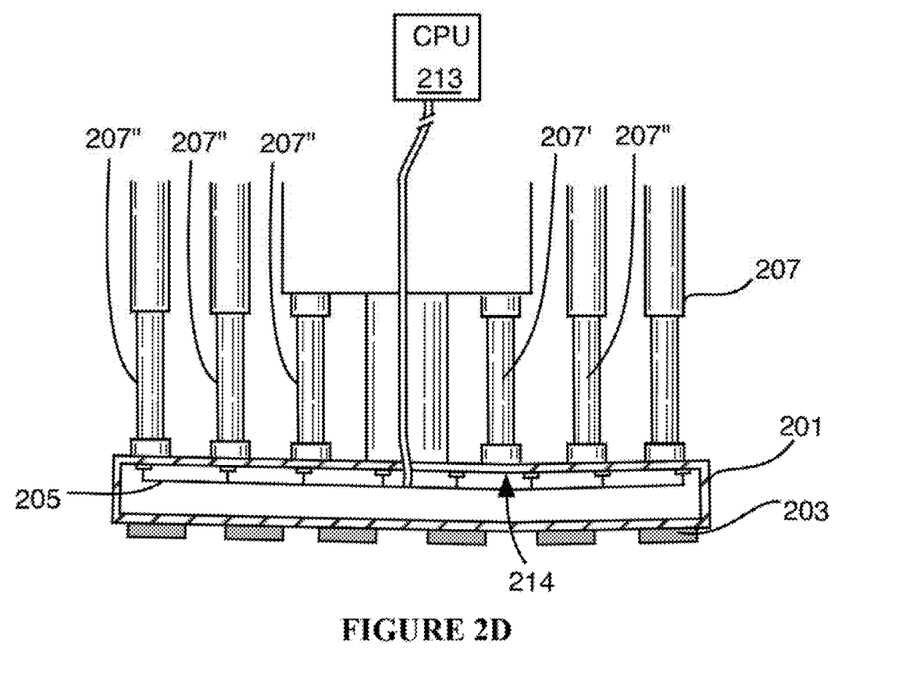
FIG. 2D shows a downward flexure.
Figure 2E:
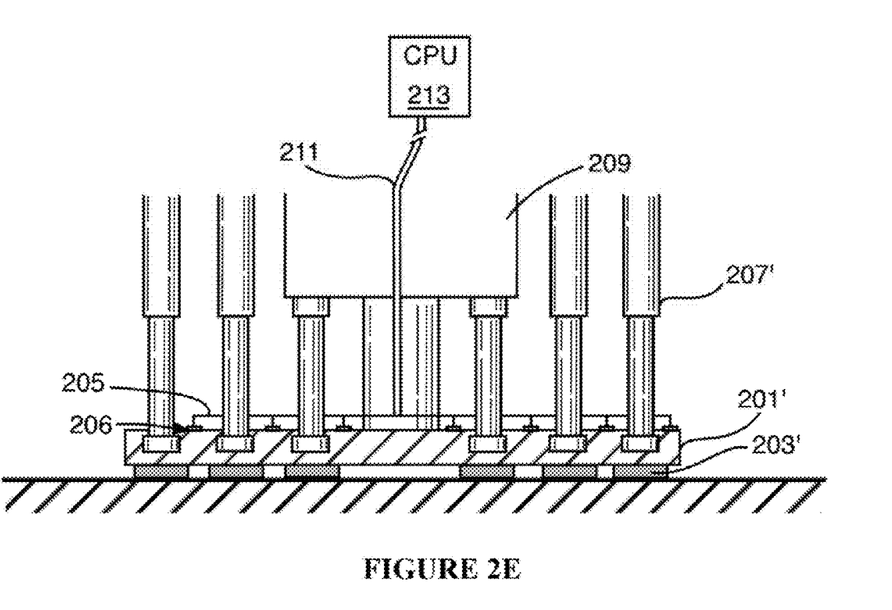
FIG. 2E shows an alternative embodiment of FIG. 2A.

Another variant is illustrated in FIG. 2D, where a point of flexure 214 is detected directly underneath actuator 207'. Unlike FIG. 2C, here the flexure is downward, therefore actuating single actuator may not be sufficient to compensate the flexure. Instead, the CPU 213 calculated a matrix of magnitude and position of forces to be exerted in relation to (surrounding) the point of flexure 214. To warp the baseplate, the actuators 207" closer to the point of flexure are to exert greater force, whereas those further away from the point of flexure are to exert less force, as expressed by $\tau = r \times F$, where $\tau$ is torque, r is lever-arm distance vector, and F is the force vector. As to the actuator 207' directly above the point of flexure, zero force is to be exerted. The calculated matrix is then executed by each assigned actuator to compensate for the flexure.

Another example is illustrated in FIG. 2B that is similar to FIG. 2A, except additional deformation sensors 206 are configured in the plate body 201 to detect the degree and position of flexure. The feedback circuit 205 is therefore connected to the deformation sensors 206 and CPU 213. Load cells 203 are used simply to measure the ground force. Here the deformation sensors are piezoelectric type sensors that are most cost-efficient for their accuracy, and any deformation of the baseplate from substantially flat will be detected. However, other deformation sensors can also be used. The deformation sensors 206 not only detect the occurrence of the flexure, but also the degree of flexure by measuring the curvature. When the deformation occurs for a period of time longer than 100 microseconds, the CPU determines that flexure occurs because the baseplate should return to its status before any strain is applied once the strain is removed.

The force to be exerted by the actuators should be calculated in such a way that it reverts the flexure but does not cause damage to the baseplate. When the flexure is irreversible due to metal fatigue or even fracture, a force too great in the opposite direction of the strain may cause further damage to the baseplate. Theoretically by detecting the point and degree of flexure in the baseplate, as well as the physical parameters of the baseplate, the CPU 213 can determine whether a metal fatigue or fracture occurs. If that is the case, instead of applying compensating force by the actuators, CPU 213 may instead send error messages to the user to effect maintenance or replacement of parts.

Figure 3:
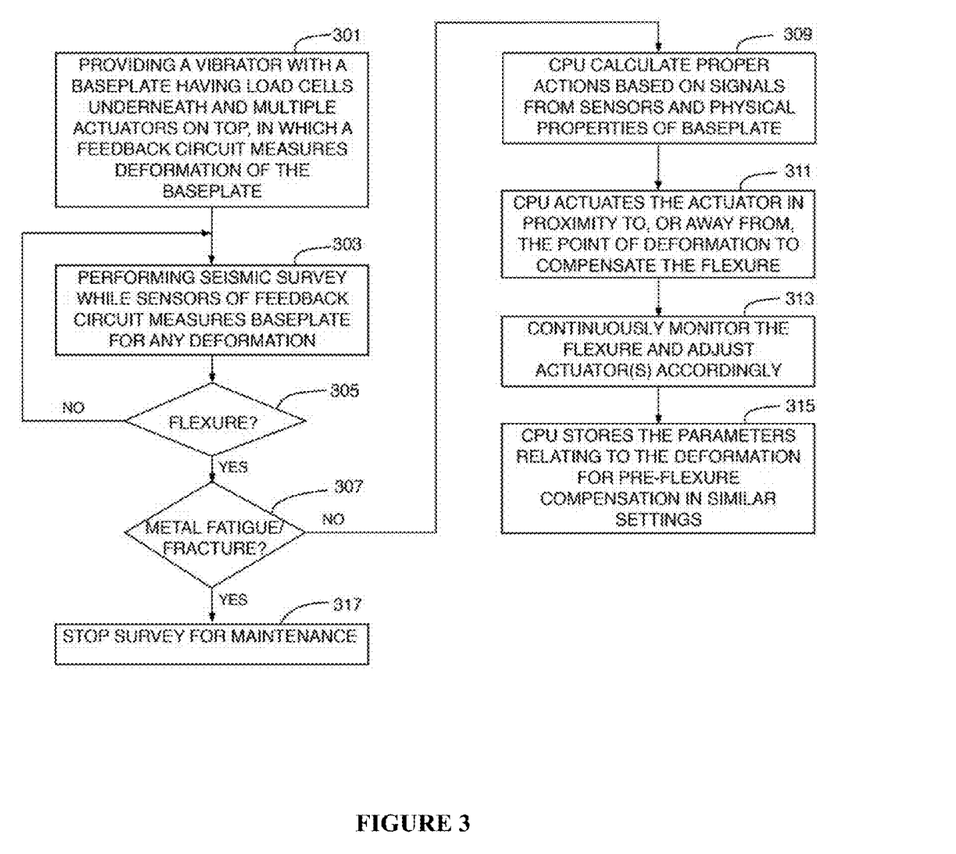
FIG. 3 is a flow diagram of the disclosed method.

FIG. 3 is a flow diagram illustrating the disclosed method. In step 301, a seismic truck having the baseplate discussed above is provided. In step 303, seismic survey is conducted while sensors that connects to the feedback circuit measures the baseplate for any deformation, and if so, where and the degree of it. The information via the circuit is transmitted to the CPU for further processing.

In step 305, the CPU decides whether there is any flexure. If there is no flexure present, the seismic survey continues until one is present. If there is flexure, the system proceeds to step 307.

In optional step 307, the CPU decides whether there is metal fatigue or fracture based on the position and degree of flexure, as well as the physical properties of the base plate. If there is metal fatigue or fracture, the CPU proceeds to step 317 and temporarily stops the survey and calls for maintenance. If there is no fracture, the system proceeds to step 309 in the attempt to compensate the flexure.

In step 309, the CPU calculates proper actions based on the signals from the feedback circuit and the physical properties of the baseplate. The goal is to compensate the flexure or other distortion so that the baseplate has proper coupling with the ground to impart consistent seismic signals, while not damaging the baseplate. The result of the calculation is a matrix of magnitude and position of forces to be actuated by the matrix of actuators.

In step 311, the CPU actuates the actuators based on the calculated matrix. Depending on the type and position of the flexure, the matrix can mean actual one single actuator directly above the flexure, or a plurality of actuators in the vicinity with varying force.

In optional step 313, after the actuators applied the calculated forces, the deformation sensors continue to monitor the baseplate to see if the flexure has been corrected.

In optional step 315, CPU stores the parameters and matrix relating to this deformation, such that if similar circumstances arise, the pre-stored parameters and matrix can be pulled for comparison and used repeatedly. For example, if the seismic survey truck is located on a slope where uneven coupling between the baseplate and the ground is prone to occur, a pre-flexure compensation matrix may be actuated in advance to prevent the flexure from happening. Other physical parameters that may be recorded may include: frequency of the seismic energy when the flexure occurs, because materials have resonance at which frequency they oscillate with greater amplitude; force of the seismic energy when the flexure occurs; ambient temperature and humidity at the time of survey; the length of the seismic survey; the time under which the baseplate has been continuously in operation; material of the ground, i.e. the more rigid it is, the more reaction force is exerted back at the baseplate.

The following citations are incorporated by reference in their entirety herein for all purposes.
EP2365357
U.S. Pat. No. 8,276,462
U.S. Pat. No. 8,261,875
U.S. Pat. No. 8,371,416

The invention claimed is:

1. A seismic vibrator truck, having a baseplate comprising:
   a) a plate body that is substantially planar and having a bottom surface and a top surface;
   b) an array of load cells mounted near said bottom surface of the plate body so that the load cells can measure a plurality of forces the baseplate applies to the ground;
   c) a plurality of actuators mounted above the top surface of the plate body and capable of reversibly contacting said top surface of said plate body;
   d) a central processing unit (CPU) operably coupled to said actuators and said load cells;
   wherein when a flexure in said plate body is detected by uneven forces measured by said load cells and said CPU controls the actuation of said plurality of actuators to compensate for said flexure.

2. The seismic vibrator truck of claim 1, wherein said load cells are mounted between said bottom surface and said top surface.

3. The seismic vibrator truck of claim 1, wherein said load cells are mounted between said base plate and said ground surface.

4. The seismic vibrator truck of claim 1, wherein said load cells are mounted to a lower side of said top surface.

5. The seismic vibrator truck of claim 1, wherein said load cells are mounted on an upper side of said top surface.

6. A seismic vibrator truck, having a baseplate comprising:
   a) a plate body that is substantially planar and having a bottom surface and a top surface;
   b) an array of load cells mounted near said bottom surface of the plate body so that the load cells can measure a plurality of forces the baseplate applies to the ground;
   c) a plurality of actuators mounted above the top surface of the plate body and capable of reversibly contacting said top surface of said plate body;
   d) a central processing unit (CPU) operably coupled to said actuators and said load cells;
   wherein when a flexure in said plate body is detected with said load cells and said CPU controls the actuation of said plurality of actuators to compensate for said flexure; and
   e) at least one deformation sensor operably coupled to the plate body and the CPU, and said deformation sensor detects position and degree of flexure.

7. A baseplate for use in a seismic survey, comprising:
   a) a plate body that is substantially planar and having a top surface and a bottom surface to contact a ground surface;
   b) an array of sensors mounted near the bottom surface of the plate body, wherein said sensors measures a plurality of forces the plate body applies to the ground surface or a flexure in said plate body or both;
   c) a plurality of actuators mounted to reversible contact a top surface of the plate body;
   d) a processor operably coupled with the actuators and the sensors;
   wherein when a flexure or differential force is detected by said sensors, said processor controls the actuation of the actuators to compensate for said flexure or differential force; and
   e) at least one deformation sensor operably coupled to the plate body and the CPU, and said deformation sensor detects position and degree of the flexure.

8. The baseplate of claim 7, wherein said sensors are mounted between said bottom surface and said top surface.

9. The baseplate of claim 7, wherein said sensors are mounted between said base plate and said ground surface.

10. The baseplate of claim 7, wherein said sensors are mounted to a lower side of said top surface.

11. The baseplate of claim 7, wherein said sensors are mounted on an upper side of said top surface.

12. The baseplate of claim 7, wherein said sensors measure force or flexure or both.

13. A method of compensating for distortion of a baseplate of a seismic vibrator vehicle used in a seismic survey, said method comprising the steps of:
   a) providing a baseplate in contact with a surface of an area to be surveyed;
   b) providing a plurality of actuators for imparting a plurality of forces to said baseplate;
   c) providing an array of sensors near said baseplate, wherein said array of sensors measuring the plurality of forces applied to said surface or said baseplate;
   d) detecting a position and a degree of a flexure of said baseplate or a differential force with said array of sensors;
   e) calculating a compensating matrix that comprises the magnitude and position of forces to be exerted on said baseplate to compensate for said flexure or differential force;
   f) executing said compensating matrix through said plurality of actuators to compensate for said flexure or differential force.

14. The method of claim 13, further comprising the steps of:
- b-1) determining if the flexure is caused by metal fatigue or fracture of the plate body; and
- b-2) if yes, halting the seismic survey for maintaining or replacing said baseplate.

15. The method of claim 13, further comprising:
monitoring the array of sensors to determine whether the compensating matrix corrects the flexure or differential force.

16. The method of claim 13, further comprising:
storing the compensating matrix and corresponding physical parameters of the flexure or differential force.

17. A method of compensating for a flexure of a baseplate of a seismic vehicle used in a seismic survey, comprising the steps of:
- a) providing a baseplate of claim 1 or 7;
- b) detecting a position and a degree of a flexure in said plate body or a differential force or both;
- c) calculating a compensating matrix that comprises the magnitude and position of forces to be exerted on the plate body to compensate for said flexure or differential force or both;
- d) executing the compensating matrix through the plurality of actuators to compensate for said flexure or differential force or both.

18. The method of claim 17, further comprising the steps of:
- b-1) determining whether the flexure is caused by metal fatigue or fracture of the plate body; and
- b-2) if so, halting the seismic survey in order to repair or replace the baseplate.

19. The method of claim 17, further comprising:
monitoring the baseplate to determine whether the compensating matrix corrects the flexure or differential force.

20. The method of claim 17, further comprising:
storing the compensating matrix and corresponding physical parameters of the flexure or differential force.

* * * * *